United States Patent [19]

Vanderschaeghe

[11] Patent Number: 4,658,165
[45] Date of Patent: Apr. 14, 1987

[54] ROTATING MACHINES WITH MAGNETS ON THE ROTOR

[75] Inventor: Christian Vanderschaeghe, Gonesse, France

[73] Assignee: Precision Mecanique Labinal, France

[21] Appl. No.: 628,900

[22] Filed: Jul. 9, 1984

[30] Foreign Application Priority Data

Jul. 7, 1983 [FR] France ............................ 83 11325

[51] Int. Cl.⁴ ............................................ H02K 21/12
[52] U.S. Cl. .................................... 310/156; 310/166; 310/218; 310/261
[58] Field of Search ............... 310/156, 166, 216, 218, 310/162, 163, 261, 211, 181, 265; 324/146

[56] References Cited

U.S. PATENT DOCUMENTS

| 4,127,786 | 11/1978 | Volkrodt | 310/156 |
| 4,302,693 | 11/1981 | Burgmeier | 310/156 |
| 4,403,161 | 9/1983 | Mijashita | 310/156 |
| 4,486,678 | 12/1984 | Olson | 310/156 |

FOREIGN PATENT DOCUMENTS

| 1563040 | 4/1970 | Fed. Rep. of Germany | 310/156 |
| 2062486 | 7/1972 | Fed. Rep. of Germany | 310/156 |
| 1303243 | 7/1962 | France | 310/166 |
| 1313993 | 11/1962 | France | 310/156 |
| 2162595 | 7/1973 | France | 310/156 |
| 0127404 | 11/1976 | Japan | 310/156 |
| 1177247 | 1/1970 | United Kingdom | 310/156 |

Primary Examiner—R. Skudy
Attorney, Agent, or Firm—Larson and Taylor

[57] ABSTRACT

A rotating machine is provided of the type in which the rotor includes a plurality of radial permanent magnets joined by pole pieces in the form of arcs of a circle, wherein the pole pieces have slots therein which oppose the propagation of magnetic fluxes in any direction other than the substantially radial direction of the concentration of the armature flux. The result is a notable increase in the power-to-weight ratio of the machine.

11 Claims, 3 Drawing Figures

ROTATING MACHINES WITH MAGNETS ON THE ROTOR

FIELD OF THE INVENTION

The present invention concerns an improvement in rotating machines, i.e., either motors or generators, with magnets on the rotor, these machines being of the type which comprise a rotor, provided with permanent magnets, rotating within a stator with a plurality of windings.

BACKGROUND OF THE INVENTION

Rotating machines are already known wherein the rotors include tangential magnets which are placed around the periphery of the rotor and are radially magnetized. These machines provide an inductive excitation which is relatively weak because of the nature of the magnets and because of their relatively low level of operation. On the other hand, a high linear density current can be provided in the stator, and the magnetic armature reaction in the rotor remains low because the magnets, which are the major component of the periphery of the rotor, are equivalent to an appreciable air gap.

Because of the weak excitation induction provided, the generated torque is limited to low values, despite the high linear current density.

To raise the excitation induction level, i.e., in order to increase the inductive forces generated, machines have been proposed wherein the rotor has radial portions joined by polar masses which concentrate the magnetic flux in the direction of the air gap. Such machines feature a high inductive excitation as a result of the concentration of the flux, which is additionally increased because the total surface of the magnets can be greater than the surface area of the air gap beyond a certain number of poles.

On the other hand, only a relatively low linear current density can be provided in the stator due to the fact that the magnetic armature reaction increases rapidly, because these machines have a small air gap and the pole masses reduce the distance covered by the lines of magnetic field produced by the stator currents. The result is that the torque which can be generated with such machines is also limited to low values and cannot be greatly increased.

A number of rotating machines with magnets have been proposed wherein the pole pieces include different kinds of recesses or the like. However, the purposes of these recesses are completely different from that of limiting of the armature reaction flux, and thus the use of these recesses is completely different from that of the invention. For example, French Pat. No. 2 162 595 describes a machine with magnets on the rotor in which slots are provided in the pole pieces to limit the magnetic excitation flux and to direct this flux radially. This arrangement inhibits the propagation of the excitation flux in the central and largest part of the pole pieces, while, as explained below, in accordance with the present invention, a high excitation is sought, together with a limitation on the armature reaction flux.

German Patent Application No. 2 062 486 describes a machine with magnets on the rotor in which the recesses are arranged in the pole pieces in the vicinity of the centripetal base of the pole pieces. The object there is to obtain a regulation capability for the state of saturation and thus to influence the magnetic resistance in the main circuit. Such an arrangement will not satisfactorily oppose the propagation of armature fluxes in most of the pole piece.

Japanese Pat. No. 51-127 404 describes a synchronous motor of a construction intended to resist demagnetization of the continuous stator magnetic flux. The flux is shunted through a passage in the central part of the pole pieces but without interruption. The pole pieces hve small circular obstacles provided on their peripheries but these cannot oppose the greater part of the armature reaction flux in the pole piece.

French Pat. No. 1 313 993 describes a rotary machine with magents and including a relatively large recess in the pole pieces filled with a nonmagnetic material and intended to facilitate manufacture of the rotor and to decrease the weight thereof. However, such a large recess in the surface area is an obstacle to the satisfactory propagation of the excitation flux. Moreover, in such a device, which includes a great number of magnets so that the pole pieces are of relatively small angular amplitude, the reaction flux tends to be concentrated in the peripheral part of the pole pieces, where the aforementioned recess does not extend.

French Pat. No. 1 303 243 describes a rotor provided with a great number of permanent magnets placed in such a manner as to inhibit the passage of the armature reaction flux. This is an extremely complex and costly construction and because of this, suffers substantial drawbacks.

German Application No. 1 563 040 also describes a rotor having a great number of magnets which inhibit the propagation of armature reaction flux and which, between them, define pole pieces of small angular amplitude. Such an arrangement exhibits substantially the same characteristics as that of French Pat. No. 1 313 993.

SUMMARY OF THE INVENTION

The present invention is concerned with overcoming the drawbacks of the prior art discussed above and constitutes an improvement in rotating machines with magnets on the rotor which can simply and economically provide a high excitation induction, i.e., relatively large inductive forces, while supporting a high linear current density in the stator.

Another objective of the invention is to increase the level of the power output for this type of machine.

The invention relates to an improved rotating machine, with magnets on the rotor, the machine of the type in which the rotor has a plurality of permanent magnets arranged thereon that extend radially and are respectively joined together by pole pieces in the form of arcs of circles, so as to concentrate the inductive flux toward the stator. The machine of the invention is characterized in that the pole pieces oppose the propagation of the armature reaction magnetic fluxes and, to this end, include slots which are arranged so as to extend substantially radially or in somewhat slanted relation to the radial symmetry of the pole pieces, and which terminate at the periphery or in the vicinity of the periphery of the pole pieces, while permitting the concentration of the excitation fluxes.

These slots can optionally open into the air gap between the rotor and stator although it is preferred that the slots do not open in the air gap for reasons having to do with the mechanical stability of the rotor. The number and the dimensions of the slots can vary. The slot width is preferably equal to at least a few tenths of a millimeter.

The slots can advantageously be produced by cutting pieces of sheet metal which form pole pieces when stacked, or else by other techniques such as, for example by machining solid pole pieces.

It has been established that the presence of these slots limits armature reaction fluxes to practically negligible levels without disturbing the excitation fluxes.

Thus it is possible to increase the power-to-weight ratio of machines according to the invention on the order of 200%, which also permits a gain in weight and bulk.

In another, less advantageous embodiment of the invention, the pole pieces, instead of having slots, can be realized from pieces of directionally oriented sheet metal, in which the direction of orientation corresponds closely to the direction of the slots.

Other features and advantages of the invention will set forth in, or apparent from, the detailed description of the preferred embodiment which follows.

BRIEF DESCRIPTION OF THE DRAWINGS

These other advantages and characteristics of the invention will appear from reading the following description, provided as a non-limiting example, and from referring to the attached drawing, wherein.

DESCRIPTION OF THE PREFERRED EMBODIMENT

Figure 1:
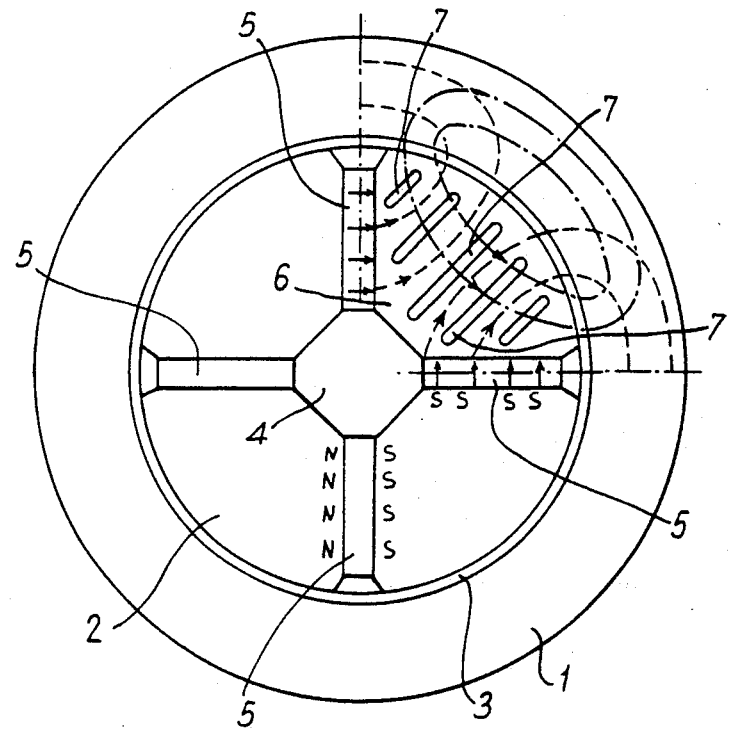
FIG. 1 is a diagram of an electric motor according to the invention.

Referring first to FIG. 1, a diagrammatic end view is shown of a machine having a stator 1 and a rotor 2 with a radial clearance or gap 3 between rotor and stator. The rotor 2 has a nonmagnetic shaft 4 carrying four radial magnets 5, fabricated of ferrite, for example, with the opposite radial surfaces of magnets 5 corresponding to different polarities as shown. Magnets 5 are so arranged that the adjacent surfaces of two consecutive magnets possess the same polarity. Magnets 5 are joined by pole pieces 6 which, for example, are implemented by stacks of pieces of sheet metal which, as illustrated, are formed generally in the shape of sectors of a circle, and which concentrate the lines of excitation flux essentially radially toward the stator. The broken lines in FIG. 1 are the excitation flux lines. As shown in FIG. 1, pole pieces 6 are disposed between magnets 5 and extend radially between the non-magnetic shaft 4 and the periphery of the rotor 2.

In accordance with the invention, the pole pieces 6 are provided with a plurality of slots or elongated openings 7 which can be arranged radially but, as in the embodiment which is illustrated, the slots all extend parallel to each other and to the radially extending median geometric line of pole piece 6, which is aligned with the longest slot 7. It is obvious that slots 7 do not open into air gap 3, so that the magnetic path provided by pole piece 6 is uninterrupted in this area.

Considering the machine of FIG. 1 in operation, the inductive flux produced by the magnets 5 induces large current densities in the stator windings (not shown). However, the generated armature reaction, which tends to produce a corresponding armature reaction flux, as represented by the dot-dash lines in FIG. 1, is blocked by the presence of slots 7 which form an obstacle to the propagation of the magnetic fields. Further, the radial magnets 5 themselves also form obstacles to the propagation of the armature reaction flux, so that the armature reaction actually produced is quite weak and practically negligible. Thus it is possible with the present invention to obtain greatly increased power-to-weight ratios as compared with the prior art.

Figure 2:
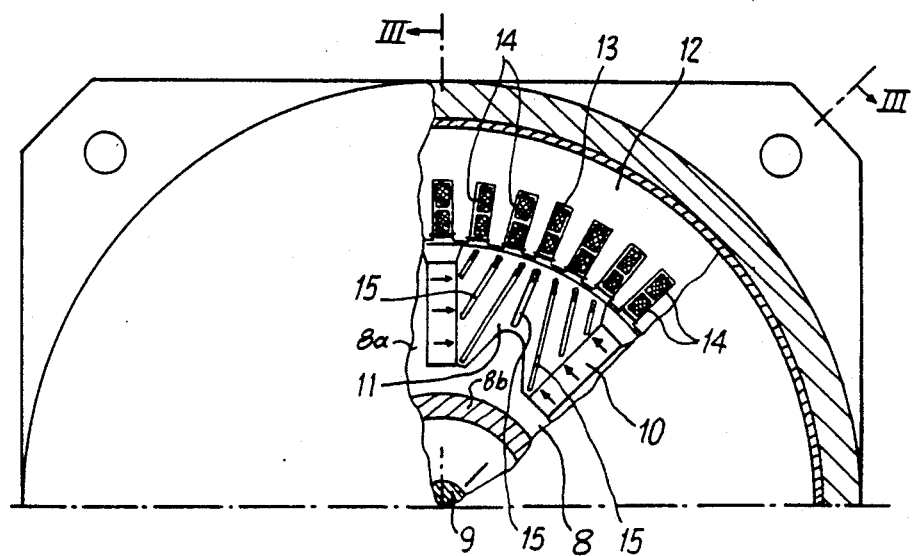
FIG. 2 is a transverse cross section of a motor according to one modification of the invention, taken generally along line II—II of FIG. 3.
Figure 3:
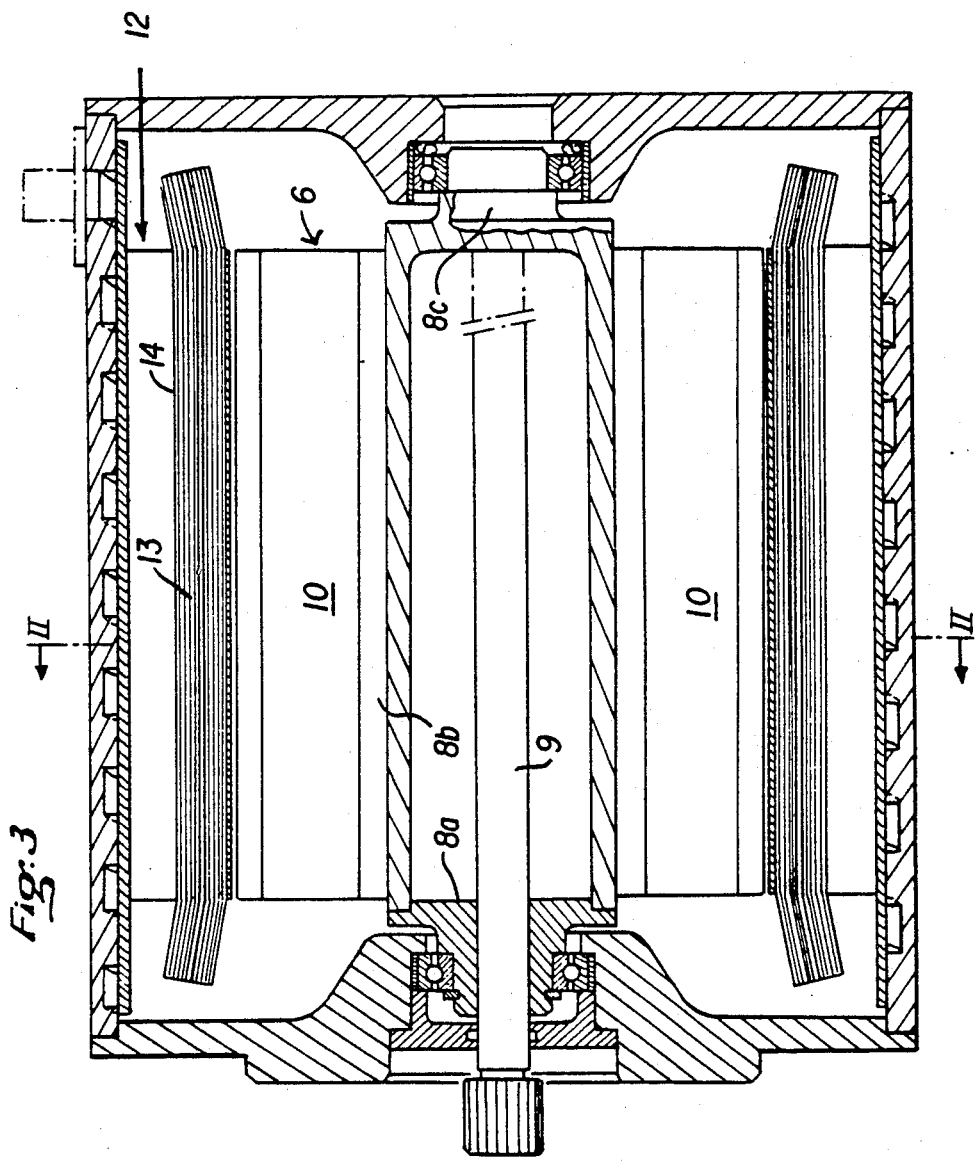
FIG. 3 is an axial cross section of the motor of FIG. 2, taken generally along line III—III of FIG. 2.

Referring to FIGS. 2 and 3, in the machine illustrated, the rotor 8 is mounted on a shaft 9, and is provided eight magnets 10 which are comparable to magnets 5 of FIG. 1, and which are also arranged radially. Rotor 8 is mounted on shaft 9 by means including a central cylindrical hub 8b and connecting end pieces 8c. Pole pieces 11, which are comparable to pole pieces 6 of FIG. 1, also orient the inductive flux toward a stator 12, the stator 12 including slots or recesses 13 for receiving windings 14.

In accordance with the invention, the pole pieces 11 also include a plurality of slots 15 which are arranged in slightly diverging pattern toward shaft 9. These slots 15 extend through the greatest part of the radial thickness of pole pieces 11. As indicated in FIG. 2, the inner periphery of pole pieces 11 is curved and includes a central recess or indention therein.

The machine shown in FIGS. 2 and 3 provides a very great linear spread of magnets 10 relative to each pole piece 11, which is reflected in a great concentration of inductive flux, oriented radially, and circulating between slots 15. An extremely high linear current density in the stator is therefore possible. Here too, the strong armature reaction which would normally tend to be generated is inhibited by the presence of the slots and the magnets themselves.

The number of slots in a pole piece can vary as a function of the dimensions, the number of poles and resulting angular dimensions of the pole pieces, as well as the electromagnetization of the machine itself. There can be one or more slots.

In is advantageous and preferable that the mean ratio between slots in relation to the pole pieces, in other words, the ratio of the total length over which the slots are distributed, as measured around an arc of a circle centered on the axis of rotation and extending from one end to the other of a pole piece essentially at the point of half the radial thickness thereof, to the length of this arc of a circle, lies between approximately 30% and 90%, i.e., electrically, between 60 and 180.

Although the invention has been described relative to exemplary embodiments, it will be understood the invention is not so limited and that various modifications, including those of form or material, are possible without exceeding the scope of the spirit of the invention.

I claim:

1. A rotating machine comprising a rotor and a stator, a non-magnetic shaft located centrally of said rotor, a plurality of permanent magnets arranged radially on said rotor and carried by said shaft and joined together respectively by pole pieces in the form of a sector of a circle so as to concentrate the flux of the magnets toward the stator, and pole pieces extending radially between said non-magnetic shaft and the outer periphery of said rotor, between their respective magnets, each of said pole pieces including a plurality of elongated slots arranged to oppose the propagation of magnetic fluxes of armature reaction, said slots extending essentially radially of the associated pole piece, and terminating at least close to the periphery of the pole piece.

2. A machine as claimed in claim 1, wherein said slots are closed at their two ends.

3. A machine as claimed in claim 1, wherein said slots are formed in pieces of sheet metal which are stacked to form the pole pieces.

4. A machine as claimed in claim 1 wherein said slots extend parallel to each other and to the mean radial direction of the associated pole piece.

5. A machine as claimed in claim 1, wherein the slots of each pole piece diverge slightly in relation to the direction of the axis of the rotor.

6. A machine as claimed in claim 1, wherein the mean ratio between the slots in relation to the pole pieces is between approximately 30% and approximately 90%.

7. A rotating machine comprising a rotor and a stator, a non-magnetic shaft located centrally of said rotor, a plurality of permanent magnets arranged on said rotor and carried by said shaft and joined together respectively by pole pieces in the form of a sector of a cricle so as to concentrate the flux of the magnets toward the stator, said pole pieces extending radially between said non-magnetic shaft and the outer periphery of said rotor, between their respective magnets, each of said pole pieces including a plurality of slots arranged to oppose the propagation of magnetic fluxes of armature reaction, said slots extending in a slightly slanted orientation in relation to the radial symmetry of the associated pole piece and terminating at least close to the periphery of the pole piece.

8. A machine as claimed in claim 7, wherein said slots are closed at their two ends.

9. A machine as claimed in claim 7, wherein said slots are formed in pieces of sheet metal which are stacked to form the pole pieces.

10. A machine as claimed in claim 7, wherein at least some of said slots extend parallel to each other.

11. A machine as claimed in claim 7, wherein the mean ratio between the slots in relation to the pole pieces is between approximately 30% and approximately 90%.

* * * * *